United States Patent [19]

Ueno et al.

[11] 4,283,511
[45] Aug. 11, 1981

[54] METHOD FOR PRODUCING MODIFIED POLYPHENYLENE OXIDES

[75] Inventors: Katsuji Ueno, Hirakata; Takashi Maruyama, Toyonaka, both of Japan

[73] Assignee: Sumitomo Chemical Company, Limited, Osaka, Japan

[21] Appl. No.: 135,236

[22] Filed: Mar. 31, 1980

[30] Foreign Application Priority Data

Apr. 12, 1979 [JP] Japan .................................. 54/45093

[51] Int. Cl.$^3$ ............................................. C08F 283/08
[52] U.S. Cl. ......................................... 525/392; 260/8;
 260/17 A; 260/17.2; 260/29.2 R; 260/29.6 NR;
 260/37 R; 525/132; 525/391; 525/397; 525/905
[58] Field of Search ............... 525/392, 391, 397, 905;
 260/29.6 NR, 42.44, 42.49, 42.54, 42.55, 42.57,
 8, 17 A, 17.2, 29.2 R

[56] References Cited

U.S. PATENT DOCUMENTS

| | | | |
|---|---|---|---|
| 3,781,382 | 12/1973 | Izawa et al. | 525/392 |
| 3,862,263 | 1/1975 | Maruta et al. | 525/392 |

*Primary Examiner*—J. Ziegler
*Attorney, Agent, or Firm*—Stevens, Davis, Miller & Mosher

[57] ABSTRACT

A method for producing a modified polyphenylene oxide which comprises polymerizing 69 to 25 parts by weight of a mixture of 97 to 45% by weight of a styrene monomer and 3 to 55% by weight of a polar vinyl monomer at 90° to 190° C. using 0.3 to 10 parts by weight of a radical initiator in an aqueous dispersion containing a dispersion stabilizer alone or in combination with at least one of a surfactant and an adhesion-preventing agent in the presence of 31 to 75 parts by weight of a polyphenylene oxide having a unit structure of the formula,

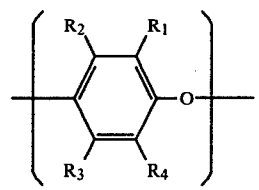

wherein $R_1$, $R_2$, $R_3$ and $R_4$ are each a hydrogen or halogen atom, or a hydrocarbon, substituted hydrocarbon, cyano, hydrocarbonoxy, substituted hydrocarbonoxy, nitro or amino group.

14 Claims, 2 Drawing Figures

METHOD FOR PRODUCING MODIFIED POLYPHENYLENE OXIDES

The present invention relates to a method for producing modified polyphenylene oxides having excellent characteristics.

Polyphenylene oxides are widely known as a resin having excellent heat resistance, mechanical property and electric properties, while its drawback is that processability is poor because of its properties such as high softening point and low flowability.

Graft-copolymerization of a styrene to a polyphenylene oxide is known as a method for improving the processability and moldability of polyphenylene oxides without lowering the excellent properties. As graft-copolymerization techniques, bulk polymerization, solution polymerization and suspension polymerization are known. The drawback of bulk polymerization is that the removal of polymerization heat from highly viscous polymerization mixture and the separation of unreacted monomer from polymer are difficult. In suspension polymerization, on the other hand, aqueous dispersion liquors of monomer are used so that the removal of polymerization heat is achieved by using the water as medium. Besides, there is no necessity of considering the separation of unreacted monomer from polymer, because the polymerization is allowed to proceed to about 100% in a polymerization vessel. Consequently, the polymerization technique is simple in terms of engineering.

Suspension polymerization of a styrene in the presence of a polyphenylene oxide is disclosed in Dutch Pat. Nos. 6671395 and 6617529 and French Pat. No. 1551503. Either of these methods uses large amounts of styrene as against a polyphenylene oxide, and therefore the technique should be considered as modification of a polystyrene rather than modification of polyphenylene oxide.

According to Japanese Patent Publication No. 47862/1972, relatively good results on graft efficiency and molecular weight are obtained by using relatively small amounts of a styrene in the presence of a polyphenylene oxide, but these results are also still unsatisfactory in physical and chemical properties.

It is generally well known that graft-copolymers of high graft efficiency have remarkably different physical properties from those of the simple mixture, for example, they are outstandingly advantageous in mechanical properties as compared with the simple mixture.

That the graft-copolymers have a high molecular weight is also very desirable in terms of tensile strength.

As a result of further study on the foregoing points, the inventors succeeded in obtaining graft-copolymers of good graft efficiency and high molecular weight. The inventors thus attained the present invention.

An object of the present invention is to provide modified polyphenylene oxides grafted with a styrene monomer and a polar vinyl monomer.

Another object of the present invention is to provide modified polyphenylene oxides having improved physical and chemical properties.

Other objects and advantages of the present invention will become apparent from the following description.

According to the present invention, there is provided a method for producing modified polyphenylene oxides which comprises polymerizing 31 to 75 parts by weight of polyphenylene oxide and 69 to 25 parts by weight of a mixture of 97 to 45% by weight of a styrene monomer and 3 to 55% by weight of a polar vinyl monomer at 90° to 190° C. using 0.3 to 10 parts by weight of a radical initiator in an aqueous dispersion containing a dispersion stabilizer alone or in combination with at least one of a surfactant and an adhesion-preventing agent.

BRIEF EXPLANATION OF THE DRAWINGS

In the accompanying drawings.

Figure 1:
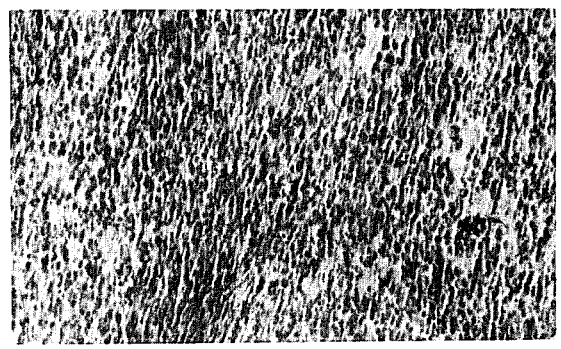
FIG. 1 shows an electron microscopic photograph of the polyphenylene oxide/styrene/acrylonitrile graft-copolymer obtained by the method (Example 6) of the present invention.

The polyphenylene oxide used in the present invention is one having a unit structure of the formula,

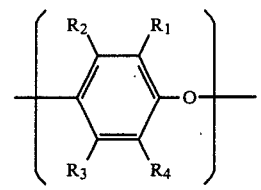

wherein $R_1$, $R_2$, $R_3$ and $R_4$ are each a hydrogen or halogen atom, or a hydrocarbon, substituted hydrocarbon, cyano, hydrocarbonoxy, substituted hydrocarbonoxy, nitro or amino group.

Specific examples of $R_1$, $R_2$, $R_3$ and $R_4$ include for example hydrogen, chlorine, bromine and iodine atoms and methyl, ethyl, propyl, allyl, phenyl, benzyl, methylbenzyl, chloromethyl, bromomethyl, cyanoethyl, cyano, methoxy, monochloromethoxy, ethoxy, phenoxy, nitro and amino groups.

Specifically, there may be given for example poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-ditolyl-1,4-phenylene oxide, poly-2,6-dichloro-1,4-phenylene oxide, poly-2,6-diphenyl-1,4-phenylene oxide, poly-2,5-dimethyl-1,4-phenylene oxide, poly-2,3,6-trimethyl-1,4-phenylene oxide and copolymers thereof.

As specific examples of the copolymer, there may be given for example a copolymer of 2,6-xylenol and 2,3,6-trimethylphenol, a copolymer of 2,6-xylenol and m-cresol and a copolymer of 2,6-xylenol and bisphenol A.

The number average polymerization degree of polyphenyleneoxide used in the present invention is within a range of 50 to 300, preferably 80 to 220.

The styrene monomer used for polymerization in the present invention is a styrene represented by the formula,

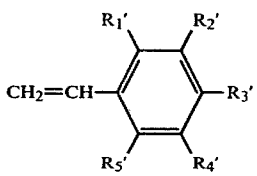

wherein $R_1'$, $R_2'$, $R_3'$, $R_4'$ and $R_5'$ are each a hydrogen or halogen atom, or a cyano, nitro, amino, hydroxy, carboxy, hydrocarbon, substituted hydrocarbon, hydrocarbonoxy or substituted hydrocarbonoxy group, or a mixture of the styrene and an α-substituted styrene represented by the formula,

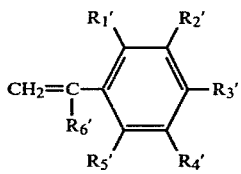

wherein $R_1'$, $R_2'$, $R_3'$, $R_4'$ and $R_5'$ are as defined above and $R_6'$ is a hydrocarbon group.

Specific examples of the groups, $R_1'$, $R_2'$, $R_3'$, $R_4'$ and $R_5'$, in the above formula representing a styrene monomer used in the present invention include for example a hydrogen atom; halogen atoms (e.g. chlorine, bromine, iodine); cyano group; nitro group; amino group; carboxyl group; hydrocarbon groups (e.g. methyl, ethyl, propyl, vinyl, allyl, benzyl, methylbenzyl); substituted hydrocarbon groups (e.g. chloromethyl, bromomethyl, cyanoethyl); hydrocarbonoxy groups (e.g. methoxy, ethoxy, phenoxy, monochloromethoxy); and substituted hydrocarbonoxy groups.

Specific examples of $R_6'$ include for example methyl, ethyl and phenyl groups.

Specific examples of the styrene monomer include for example styrene, 2,4-dichlorostyrene, p-methoxystyrene, p-nitrostyrene, p-methylstyrene, p-phenylstyrene, p-acetoxystyrene, p-divinylbenzene, p-aminostyrene, p-(chloromethoxy)styrene, m-cyanostyrene, p-aminostyrene and o-hydroxystyrene. Specific examples of the α-substituted styrene include for example α-methylstyrene, o-methyl-α-methylstyrene, m-methyl-α-methylstyrene, p-methyl-α-methylstyrene, p-methoxy-α-methylstyrene and 1,1-diphenylethylene. These styrenes and α-substituted styrenes may be used alone or in combination.

Specific examples of the polar vinyl monomer include for example acrylonitrile, α-methacrylonitrile, α-ethacrylonitrile, methyl acrylate, methyl methacrylate, butyl acrylate, ethyl methacrylate, vinyl chloride, vinylidene chloride, vinyl acetate, N-vinylpyrrolidone, N-vinyl-N-methylacetamide, ethyl vinyl ether, 2-chloroethyl vinyl ether, glycidyl methacrylate and maleic anhydride. These monomers may be used alone or in combination. Of these monomers, acrylonitrile is particularly preferred.

As to the amounts of polyphenylene oxide, styrene monomer and polar vinyl monomer, 31 to 75 parts by weight, preferably 35 to 70 parts by weight, of polyphenylene oxide and 69 to 25 parts by weight, preferably 65 to 30 parts by weight, of a mixture comprising 97 to 45% by weight, preferably 95 to 44% by weight, of styrene monomer and 3 to 55% by weight, preferably 5 to 54% by weight, of polar vinyl monomer are used.

When the amount of polyphenylene oxide is less than 31 parts by weight, characteristics of a graft-copolymer are lost in terms of mechanical properties and heat resistance. Amounts exceeding 75 parts by weight make the processability poor and the graft-copolymerization difficult. When the amount of polar vinyl monomer is less than 3% by weight, the produced graft-copolymer loses the characteristics distinguishing it from one produced with a styrene series monomer alone. On the other hand, amounts exceeding 55% by weight make the graft-copolymerization difficult and lower the processability of graft-copolymer.

The catalysts used in the present invention are organic or inorganic radical initiators commonly used as a catalyst for the suspension polymerization of styrene monomers and polar vinyl monomers. Of these initiators, organic peroxides are desirable in terms of the physical properties of graft-copolymer.

Specifically, there may be given for example decanoyl peroxide, benzoyl peroxide, 2,2-bis(tert-butylperoxy)butane, lauroyl peroxide, 3,5,5,-trimethylhexanoyl peroxide, tert-butyl perbenzoate, tert-butyl peracetate, octanoyl peroxide, stearoyl peroxide, tert-butyl perpivalate, diisopropylbenzene hydroperoxide, 2,5-dimethyl-2,5-di-tert-butyl peroxyhexane, di-tert-butyl peroxide, cyclohexanone peroxide, dicumyl peroxide, α,α'-azobisisobutyronitrile, tert-butyl peroxyisobutyrate and tert-butyl peroxylaurate.

Of these catalysts, dicumyl peroxide is particularly preferred.

As preferred radical initiators, there may be mentioned high-temperature decomposable type catalysts and a mixture of at least two catalysts, for example combined catalysts of a low-temperature decomposable type one and high-temperature decomposable type one. When said combined catalysts are used, the graft-copolymerization is firstly allowed to proceed to a certain conversion at less than about 100° C. and then to proceed to substantial completeness at further elevated temperatures.

Preferred combinations of the catalysts are given below: Lauroyl peroxide and dicumyl peroxide; lauroyl peroxide and di-tert-butyl peroxide; lauroyl peroxide and tert-butyl peroxybenzoate; lauroyl peroxide and 2,5-dimethyl-2,5-di-tert-butylperoxyhexane; 3,5,5-trimethylhexanoyl peroxide and dicumyl peroxide; 3,5,5-trimethylhexanoyl peroxide and tert-butyl peroxybenzoate; 3,5,5-trimethylhexanoyl peroxide and benzoyl peroxide; 3,5,5-trimethylhexanoyl peroxide and tert-butyl peroxide; tert-butyl peroxypivalate and di-tert-butyl peroxide; tert-butyl peroxypivalate and dicumyl peroxide; tert-butyl peroxypivalate and tert-butyl peroxybenzoate; 2,4-dichlorobenzoyl peroxide and tert-butyl peroxybenzoate; 2,4-dichlorobenzoyl peroxide and dicumyl peroxide; 2,4-dichlorobenzoyl peroxide and di-tert-butyl peroxide; 2,4-dichlorobenzoyl peroxide and 2,5-dimethyl-2,5-di-tert-butylhexane; octanoyl peroxide and dicumyl peroxide; and octanoyl peroxide and di-tert-butyl peroxide.

Further, redox catalysts, a combined catalyst of the foregoing radical initiator and a reducing agent, may be used in order to accelerate the rate of polymerization. The reducing agent includes for example dimethylaniline, p-chlorobenzenesulfinic acid, benzoin and acetoin. The use of these catalysts is particularly preferred to polymerize the styrene monomer and polar vinyl monomer, and their amounts are particularly important to elevate graft efficiency. An increase in catalyst amount is advantageous to elevate graft efficiency, while it makes the control of polymerization difficult and causes a lowering in heat distortion temperature due to catalyst residues and a rise in cost. Consequently, the amount of catalyst is preferably 0.30 to 10.0 parts by weight, particularly preferably 0.50 to 5 parts by weight.

In the present invention, the amount of water is not particularly limited as long as it keeps the suspension state of the reaction system good. Generally, however, the amount is 0.7 part by weight or more, preferably 1 to 10 parts by weight, based on 1 part by weight of the total amount of polyphenylene oxide, styrene monomer and polar vinyl monomer.

The aqueous dispersion used in the present invention contains a dispersion stabilizer. Examples of the dispersion stabilizer include for example polyvinyl alcohol, gelatin, agar, starch, glycerin, polyacrylic acid and its sodium salt, polyethylene glycol, ethylene glycol, polyacrylamide and a styrene/maleic anhydride copolymer. The amount of the stabilizer is not particularly limited, but generally it is 0.001 to 3% by weight, preferably 0.01 to 1.5% by weight, based on water. Further, the use of a cationic, anionic or nonionic surfactant is effective in stabilizing the aqueous dispersion system and smoothing the surface of the resulting bead-like polymers. The surfactant includes for example hydroxymethyl cellulose, carboxymethyl cellulose, methyl cellulose, rosin soap, sodium glycolate, sodium dodecylbenzenesulfonate, sodium stearate, polyoxyethylene monooleate, polyoxyethylene distearate, polyoxyethylene lauryl ether and lauryltrimethylammonium chloride. This surfactant is not particularly necessary when the dispersion stabilizer is used, but when it is used, its amount is 0.0005 to 0.5% by weight based on water. In addition to these additives, the addition of the so-called adhesion-preventing agents is effective in stabilizing the beads. The agents include for example water-insoluble inorganic compounds (e.g. carbonates, silicates, sulfates or phosphates of calcium, magnesium, lead or barium), oxides (e.g. alumina, bentonite, talc, clay, titanium oxide, lead oxide) and the like. But the use of the adhesion-preventing agent is not always necessary. The amount of the agent is not particularly limited, but it is preferably about 0.01 to about 5% by weight based on water. Further, water-soluble inorganic salts such as sodium sulfate may be used to allow the polymerization to proceed smoothly. These dispersion stabilizers may be used alone or in combination.

In carrying out the present invention, any one of fillers (e.g. other polymers, glass fibers, carbon fibers, carbon black, silica), plasticizers and flame retardants may be added if it does not disturb the graft-copolymerization. For elevating particularly impact resistance, the addition of rubbery polymer is preferred. Any one of rubbery polymers will do, as long as its elasticity modulus is lower than that of graft-copolymers obtained by the method of the present invention. Specific examples of the polymer include for example polybutadiene, butadiene/styrene copolymers, polyethylene, ethylene copolymers, ethylene/propylene copolymers, ethylene/propylene/conjugated diene copolymers, polyisoprene, polyisobutylene, polyacrylic ester, polyamide, polyester and modified products thereof.

The amount of rubbery polymer added is generally well known in rubbery polymer-reinforced compositions, and it is preferably 1 to 30 parts by weight based on 100 parts by weight of the total amount of polyphenylene oxide, styrene monomer and polar vinyl monomer.

When there is a necessity of regulating the contents of the polymers of styrene monomer and polar vinyl monomer in the bead-like polymers obtained by the present invention, the composition of both monomers may, of course, previously be regulated on feeding the monomers. But, this can also be achieved, during polymerization, by distilling out an excess of the unreacted monomer as an azeotropic mixture with water which is a dispersion medium.

In carrying out the present invention, there is no particular limitation to the order or method by which polyphenylene oxide, styrene monomer, polar vinyl monomer, various dispersion stabilizers and other reagents are added. As to the catalyst, however, it is desirable to previously dissolve the catalyst in the styrene series monomer and polar vinyl monomer in order to obtain uniform catalyst distribution.

In the present invention, the amounts of styrene monomer and polar vinyl monomer are so small that, when both monomers are fed in the vicinity of room temperature, a mixture comprising polyphenylene oxide and both monomers takes not a liquid form but a wet powdery form. In order to allow the polymerization of the present invention to proceed smoothly, therefore, it is desirable to thoroughly wet the polyphenylene oxide and both monomers in advance. Even though the mixture takes such a wet powdery form, it melts into a uniform suspension on elevating its temperature. Such phenomenon was never imaginable as the amounts of both monomers added are small. This phenomenon seems to be characteristic of polyphenylene oxide.

In the present invention, the polymerization temperature is preferably 90° to 190° C., particularly preferably 115° to 180° C. Even temperatures below 100° C. will do in the initial polymerization, but after a certain conversion is reached, the polymerization should substantially be completed by elevating the temperature to raise the graft efficiency higher. As to the reaction pressure, any one of atmospheric pressure, pressure higher than that and reduced pressure will do.

In the present invention, the molecular weights of the copolymer of styrene and polar vinyl monomer grafted to the polyphenylene oxide can be regulated by varying the amounts and kinds of the styrene monomer, polar vinyl monomer, polyphenylene oxide and catalyst, and reaction temperature. Generally, however, the molecular weights can also be regulated by adding a chain transfer agent used in the common polymerization reactions. The chain transfer agent includes for example mercaptans and alcohols. Also, the physical properties of the grafted polyphenylene oxide can be changed by regulating the molecular weight of the grafted styrene polymer and polar vinyl polymer and the number of branches.

That the graft-copolymers of the present invention contain substantially no ungrafted polyphenylene oxide is confirmed by the method disclosed in A. Factor et. al., J. Polymer Sci., 7B, 205 (1969). This method makes use of the properties of polyphenylene oxide and its methylene chloride complex, that is, the polyphenylene oxide forms a complex with methylene chloride, becoming insoluble in methylene chloride, and this complex easily separates methylene chloride on heating to return to the polyphenylene oxide.

Specifically, it is confirmed as follows: On dissolving the polymer obtained by the present invention in methylene chloride, the polymer forms a uniform solution, producing no precipitate; or even though precipitate is formed after standing for a long time, a polymer obtained therefrom by thorough washing and drying contains inseparable styrene copolymer. When the polymer obtained by the present invention contains not less than 10% by weight of the polyphenylene oxide homopolymer (ungrafted polyphenylene oxide), the homopolymer can easily be detected by those skilled in the art according to the method of A. Factor et al.

For various usages, the graft-copolymers according to the present invention are used alone or in combination with other polymers. Specifically, they are used as blends with styrene polymers (e.g. polystyrene, styrene/acrylonitrile copolymers, styrene/methyl methacrylate copolymers), or blends with rubber-modified styrene resins, butadiene rubber-modified styrene/acrylonitrile copolymers, acrylic rubber-modified polystyrene, acrylic rubber-modified styrene/acrylonitrile copolymers, ethylene/propylene copolymer-modified polystyrene, ethylene/methyl methacrylate copolymer-modified polystyrene, NBR or SBR. Further, the resins of the present invention may be modified by incorporating fillers (e.g. glass fibers, carbon fibers, carbon black, silica), various polymers, plasticizers or flame retardants.

The present invention will be illustrated in more detail with reference to the following Examples.

EXAMPLES 1 TO 5

Comparative Example 1

Using a 500-ml round-bottom, pressure-proof polymerization reactor equipped with a thermometer, a nitrogen-introducing pipe and a magnetic stirrer, 25 g of poly(2,6-dimethyl-1,4-phenylene oxide) [$\eta_{sp}/c = 0.59$, reduced viscosity (25° C.) of a chloroform solution having a concentration (c) of 0.5 g/100 ml] obtained by oxidation polymerization with a manganese (II) chloride-ethanolamine-methanol catalyst, was dissolved in a mixture of styrene (32 g) and acrylonitrile (4 g), and then a solution of dicumyl peroxide (1.2 g) in styrene (4 g) was added thereto. Thereafter, water (195 ml) containing 0.5% by weight of polyvinyl alcohol (polymerization degree, 2000; saponification degree, 86~89% and 0.01% by weight of sodium dodecylbenzenesulfonate was added, and the mixture was stirred at 620 rpm. The mixture was heated from 100° C. to 160° C. over 1 hour and polymerized at 160° C. for 10 hours. The product having a uniform particle size was filtered, washed with water and dried in vacuo.

The procedure was carried out in the same conditions as above except that the weight ratio of styrene to polar vinyl monomer and the kind of polar vinyl monomer were changed. The results are shown in Table 1.

TABLE 1

|  | Weight ratio of styrene monomer to polar vinyl monomer (weight/weight) | Polymerization yield (weight %) | $\eta_{sp}/c$*[1] (dl/g) | Amount of separated $CH_2Cl_2$*[2] (weight %) | Amount of polymer remaining emulsified in water (weight %) |
|---|---|---|---|---|---|
| Example 1 | Acrylonitrile/Styrene = 1/9 | 95.6 | 0.66 | 0 | 3.0 |
| Example 2 | Acrylonitrile/Styrene = 2/8 | 94.8 | 0.68 | 0 | 0.2 |
| Example 3 | Vinyl acetate/Styrene = 1/9 | 92.8 | 0.55 | 0 | 0 |
| Example 4 | Methyl acrylate/Styrene = 1/9 | 95.4 | 0.56 | 0 | 1.2 |
| Example 5 | Methyl methacrylate/Styrene = 1/9 | 96.8 | 0.58 | 0 | 1.3 |
| Comparative example 1 | Polar vinyl monomer/Styrene = 0/10 | 92.5 | 0.54 | 10.1 | 3.3 |

Note:
*[1] $\eta_{sp}/c$ means a reduced viscosity of a chloroform solution having a concentration of 0.5 g/100 ml measured at 25° C. (the condition is also the same in the following examples).
*[2] The graft-copolymer (2.0 g) was dissolved in methylene chloride (40 ml) and allowed to stand for 3 hours. When precipitates separated, they were filtered, washed with methylene chloride and then with methanol, and dried at 120° C. for 2 hours under reduced pressure to obtain a polymer (the condition is also the same in the following examples).

The following is known from Table 1.

On comparing graft-copolymers having a styrene monomer and a polar vinyl monomer grafted with those having only a styrene monomer grafted, both are obtained in the same degree of polymerization yield, but the former has a higher $\eta_{sp}/c$. Further, the graft efficiency reaches 100% by adding a polar vinyl monomer. In other words, no polyphenylene oxide homopolymer is present in the graft copolymers. Besides, the amount of polymer remaining emulsified in water becomes markedly small by adding a polar vinyl monomer. Thus, it is found that the method of the present invention is characterized by making waste water treatment easy and increasing the polymerization yield.

EXAMPLE 6

In the same manner as in Example 1, 25 g of poly(2,6-dimethyl-1,4-phenyleneoxide) was dissolved in a mixture of styrene (23.4 g) and acrylonitrile (13.6 g), and then a solution of dicumyl peroxide (1.20 g) in styrene (3 g) was added thereto. Thereafter, water (195 ml) containing 0.5% by weight of polyvinyl alcohol and 0.01% by weight of sodium dodecylbenzenesulfonate was added thereto, and the mixture was stirred at 620 rpm. The mixture was heated from 100° C. to 160° C. over 1 hour and polymerized at 160° C. for 10 hours. The product having a uniform particle size was filtered, washed with water and dried in vacuo. It was found that the yield of the product was 95%. $\eta_{sp}/c$ was 0.782. The amount of separated $CH_2Cl_2$ was zero, and no polyphenylene oxide homopolymer was present. The amount of polymer entering the aqueous phase was 0.25% by weight.

This graft-copolymer was kneaded at 250° C. for 10 minutes in a Brabender and measured for Vicat softening point. It was found that the Vicat softening point was 140° C. FIG. 1 shows an electron microscopic photograph of the pressed graft-copolymer.

Uniform dispersion is observed in FIG. 1.

Comparative Example 2

Figure 2:
FIG. 2 shows an electron microscopic photograph of the simple resin blend of polyphenylene oxide and styrene/acrylonitrile copolymer prepared in comparative example 3. The magnification of both photographs is 3000.

Polyphenylene oxide (25 g) used in Example 1 and styrene/acrylonitrile copolymer (40 g) (weight ratio of styrene to acrylonitrile, 26.4:13.6) were kneaded at 250° C. for 10 minutes in a Brabender and measured for Vicat softening point. It was found that the Vicat softening point was 138° C. FIG. 2 shows an electron microscopic photograph of the pressed resin blend.

Uniform dispersion is not observed in FIG. 2.

EXAMPLE 7

The procedure was carried out in the same manner as in Example 1 except that the weight ratio of acrylonitrile to styrene was 1:1. The amount of separated $CH_2Cl_2$ was zero.

EXAMPLE 8

The procedure was carried out in the same manner as in Example 1 except that the weight ratio of methyl methacrylate to styrene was 1:1. The amount of separated $CH_2Cl_2$ was zero.

EXAMPLE 9

To the same 5-liter reactor as used in Example 1 were added 250 g of poly(2,6-dimethyl-1,4-phenyleneoxide) [$\eta_{sp}/c = 0.50$, reduced viscosity (25° C.) of a chloroform solution having a concentration (c) of 0.5 g/100 ml] obtained by oxidation polymerization with a Cu-amine catalyst, a solution of polybutadiene rubber (32.5 g) in styrene (242.5 g), acrylonitrile (125 g), lauroyl peroxide (3.25 g) and then dicumyl peroxide (6.5 g). The mixture was well mixed to prepare a mixed system. Thereafter, water (1950 ml) containing 0.5% by weight of polyvinyl alcohol and 0.01% by weight of sodium dodecylbenzenesulfonate was added to the mixed system which was then stirred and polymerized at 90° C. for 3 hours and then at 130° C. for 15 hours. The product was filtered, washed with water, dried and granulated at 250° C. The amount of $CH_2Cl_2$ separated from the granule was zero, which means that no polyphenylene oxide homopolymer is present.

The physical properties of the injection-molded product were measured: Tensile strength, 800 kg/cm²; HDT, 110° C.; Izod impact value (with notch), 10 kg·cm/cm². A piece of the molded product was dipped in n-heptane and observed for a change in the appearance, but no change was found. This means that the product has a remarkably superior chemical resistance as compared with a simple resin blend.

What is claimed is:

1. A method for producing a modified polyphenylene oxide which comprises polymerizing 69 to 25 parts by weight of a mixture of 97 to 45% by weight of a styrene monomer and 3 to 55% by weight of a polar vinyl monomer at 90° to 190° C. using 0.3 to 10 parts by weight of a radical initiator in an aqueous dispersion containing a dispersion stabilizer alone or in combination with at least one of a surfactant and an adhesion-preventing agent in the presence of 31 to 75 parts by weight of a polyphenylene oxide having a unit structure of the formula,

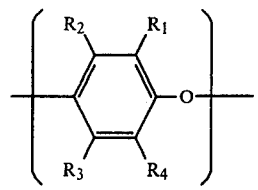

wherein $R_1$, $R_2$, $R_3$ and $R_4$ are each a hydrogen or halogen atom, or a hydrocarbon, substituted hydrocarbon, cyano, hydrocarbonoxy, substituted hydrocarbonoxy, nitro or amino group.

2. A method according to claim 1, wherein said polyphenylene oxide is a member selected from the group consisting of poly-2,6-dimethyl-1,4-phenylene oxide, poly-2,6-diethyl-1,4-phenylene oxide, poly-2,6-dipropyl-1,4-phenylene oxide, poly-2-methyl-6-allyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-ditolyl-1,4-phenylene oxide, poly-2,6-dichloro-1,4-phenylene oxide, poly-2,6-diphenyl-1,4-phenylene oxide, poly-2,5-dimethyl-1,4-phenylene oxide, poly-2,3,6-trimethyl-1,4-phenylene oxide and copolymers thereof.

3. A method according to claim 2, wherein the polyphenylene oxide is poly-2,6-dimethyl-1,4-phenylene oxide.

4. A method according to claim 2, wherein said copolymer is a copolymer of 2,6-xylenol and 2,3,6-trimethylphenol.

5. A method according to claim 1, wherein said styrene monomer is a styrene represented by the formula,

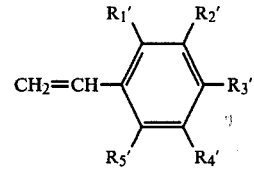

wherein $R_1'$, $R_2'$, $R_3'$, $R_4'$ and $R_5'$ are each a hydrogen or halogen atom, or a cyano, nitro, amino, hydroxy, carboxy, hydrocarbon, substituted hydrocarbon, hydrocarbonoxy or substituted hydrocarbonoxy group, or a mixture of said styrene and an α-substituted styrene represented by the formula,

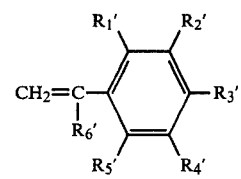

wherein $R_1'$, $R_2'$, $R_3'$, $R_4'$ and $R_5'$ are as defined above and $R_6'$ is a hydrocarbon group.

6. A method according to claim 5, wherein each $R_1'$, $R_2'$, $R_3'$, $R_4'$ and $R_5'$ are chlorine, bromine, iodine, cyano, nitro, amino, carboxyl, methyl, ethyl, propyl, vinyl, allyl, benzyl, methylbenzyl, chloromethyl, bromomethyl, cyanoethyl, methoxy, ethoxy, phenoxy or monochloro and $R_6'$ is methyl, ethyl or phenyl.

7. A method according to claim 5, wherein the styrene monomer is a member selected from the group consisting of styrene, 2,4-dichlorostyrene, p-methoxystyrene, p-nitrostyrene, p-methylstyrene, p-phenylstyrene, p-acetoxystyrene, p-divinylbenzene, p-aminostyrene, p-(chloromethoxy)styrene, m-cyanostyrene, p-aminostyrene and o-hydroxystyrene.

8. A method according to claim 5, wherein the α-substituted styrene is a member selected from the group consisting of α-methylstyrene, o-methyl-α-methylstyrene, m-methyl-α-methylstyrene, p-methyl-α-methylstyrene, p-methoxy-α-methylstyrene and 1,1-diphenylethylene.

9. A method according to claim 1, wherein said polar vinyl monomer is a member selected from the group consisting of acrylonitrile, α-methacrylonitrile, α-ethacrylonitrile, methyl acrylate, methyl methacrylate, butyl acrylate, ethyl methacrylate, vinyl chloride, vinylidene chloride, vinyl acetate, N-vinylpyrrolidone, N-vinyl-N-methylacetamide, ethyl vinyl ether, 2-chloroethyl vinyl ether, glycidyl methacrylate and maleic anhydride.

10. A method according to claim 1, wherein the polymerization is carried out at a temperature of from 115° to 180° C.

11. A method according to claim 1, wherein the weight ratio of said mixture to polyphenylene oxide is 65–30 to 35–70.

12. A method according to claim 1, wherein the amount of styrene in the mixture is 44 to 95% by weight.

13. A method according to claim 9, wherein the polar vinyl monomer is acrylonitrile.

14. A modified polyphenylene oxide prepared by the method of anyone of claims 1 to 12.

* * * * *